United States Patent [19]
Bagdasarian et al.

[11] 3,884,805
[45] May 20, 1975

[54] APPARATUS AND PROCESS FOR CONTINUOUS CONCENTRATION OF SOLIDS FROM A SOLIDS-CONTAINING FLUID

[75] Inventors: Alex Bagdasarian, Arlington; James Donovan, Cambridge, both of Mass.

[73] Assignee: Artisan Industries Inc., Waltham, Mass.

[22] Filed: May 13, 1974

[21] Appl. No.: 469,628

[52] U.S. Cl. .................... 210/65; 210/75; 210/193; 210/297; 210/334; 210/500
[51] Int. Cl. .......................................... B01d 37/02
[58] Field of Search ........ 210/70, 75, 77, 297, 298, 210/331, 413, 414, 415, 489, 65, 193, 327, 334, 500

[56] References Cited
UNITED STATES PATENTS

| | | | |
|---|---|---|---|
| 2,899,064 | 8/1959 | Cowan et al. | 210/415 X |
| 3,029,951 | 4/1962 | Cannon | 210/414 X |
| 3,159,572 | 12/1964 | Ranhagen | 210/414 |
| 3,241,675 | 3/1966 | Pashian et al. | 210/77 X |
| 3,250,396 | 5/1966 | Armstrong et al. | 210/331 |
| 3,310,171 | 3/1967 | Schmidt, Jr. et al. | 210/81 |
| 3,437,208 | 4/1969 | Kaspar et al. | 210/297 |
| 3,471,026 | 10/1969 | Riker | 210/331 |
| 3,477,575 | 11/1969 | Nemec et al. | 210/67 |
| 3,520,410 | 7/1970 | Hutto, Jr. | 210/67 |
| 3,643,806 | 2/1972 | O'Cheskey | 210/327 |
| 3,648,844 | 3/1972 | Krynski et al. | 210/331 |
| 3,692,181 | 9/1972 | Davis | 210/331 |
| 3,696,928 | 10/1972 | Schjerves | 210/75 |
| 3,759,392 | 9/1973 | Syranen | 210/415 |
| 3,785,969 | 1/1974 | Mulls et al. | 210/415 |

OTHER PUBLICATIONS

K. Michel and V. Gruber, *Experience with Continuous Pressure Filtration in a New Type Disk Filter* (Paper presented on the Annual Meeting of Process Engineers, in Munich, Oct. 13 to 15th 1970).

T. A. Malinovskaya and I. A. Kobrinsky, *The Separation of High-Dispersity Suspensions in the Dynamic Filter* (Translated from Russian—no source given).

*Primary Examiner*—Theodore A. Granger
*Attorney, Agent, or Firm*—Richard L. Cannaday

[57] ABSTRACT

The concentrator has a separation chamber which contains one or more relatively stationary filter elements and a rotor with at least one radial element of solid or hollow construction which extends substantially parallel with respect to an adjacent stationary filter element, and defines therebetween at least part of the flow path of a solids-containing fluid to be processed. Each radial element has one or more vanes projecting towards but spaced a predetermined distance from the filtering surface of an adjacent filter element. The radial elements and their vanes provide a means of positively controlling the initial build-up and maintenance during operation of the concentrator of dense, porous and generally friable filter cake layers over the filtering surfaces. The filter cake layers are formed autogenously from the solids-containing fluid being processed and remain on filtering surfaces of the filter elements throughout the period of processing of the solids-containing fluid in the concentrator. In one capability or operational attribute the filter cake layers serve as filtering media. In other capabilities the filter cake layers provide protection for the filtering surfaces during operation of the concentrator; make possible high rotational speeds of the rotor during operation of the concentrator, and permit the use of high fluid pressures within the separation chamber.

24 Claims, 10 Drawing Figures

APPARATUS AND PROCESS FOR CONTINUOUS CONCENTRATION OF SOLIDS FROM A SOLIDS-CONTAINING FLUID

BACKGROUND OF THE INVENTION

This invention relates to an apparatus and process for separating a concentrate of solids and a filtrate from a solids-containing fluid. More particularly, this invention relates to a concentrator or filter in which a cake of the filterable particulate matter being processed itself serves as a filtering medium.

Various types of devices are known both for obtaining a clarified fluid from and for concentrating the solids content of a solids-containing fluid. Such devices, however, generally require the cleaning of the filter surfaces either during use or during periodic shutdowns of the devices. U.S. Pat. No. 3,437,208 describes a device for the filtration of a solids-containing liquid in which filter surfaces are cleaned during use. In the device described in that patent, stationary filtering bodies are interdisposed between a number of rotating bodies, and particles which might tend to cling to the filtering diaphragms of the stationary bodies during operation of the device are instead continuously removed by the action of the rotating bodies, and returned into the liquid being filtered. A similar device is described in U.S. Pat. No. 3,477,575.

In prior filtering devices filter surfaces have also been cleaned for passage of filtrate therethrough by, for example, agitation of the filtering surface or by the use of mechanical scrapers such as described in U.S. Pat. Nos. 3,643,806, 3,520,410 and 3,250,396. Also, use has been made of the technique of sluicing or backwashing of the filter surface with fluid during a shutdown of the device in order to remove a cake or cakes from the filter elements, such as described in U.S. Pat. No. 3,310,171. Other prior filtering devices are also known. For example, U.S. Pat. No. 3,520,410 describes a rotary filter in which scrapers are employed to prevent any build-up of filter cake on the outside of the drum as would cause a blockage of the filter. Similarly, in U.S. Pat. No. 3,696,928 a filter-bed type apparatus is described in which solids are periodically removed from the filter medium by scraping, and a strip of filter paper or other filter medium is periodically advanced to present a clean filtering surface.

To elaboroate on the prior art, in a paper titled "Experience With Continuous Pressure Filtration In A New-Type Disk Filter" by K. Michel and V. Gruber, presented at the Annual Meeting of the Process Engineers in Munich, Oct. 13–15, 1970, reference is made to the removal of a solid deposit off of a filter medium at the very moment of its formation on the filter medium in order to avoid development of a resistance to the subsequent passage of a suspension through the filter medium. The approaches of achieving continuous elimination of a deposit on the filter medium described in the paper by Messrs. Michel and Gruber are (a) vibration and rotation of the filter medium in order to remove a developing solid layer, and (b) treatment of the suspension by agitation, pulsation and mechanical stripping-off. The disc-type filter described in that paper appears to be similar to that described in FIG. 14 of U.S. Pat. No. 3,437,208 to which reference has been made above.

As further illustrative of the known prior art, it is taught in a Russian paper by T. A. Malinovskaya and I. A. Kobrinskiy titled "The Separation of High Dispersity Suspensions In The Dynamic Filter" and identified under Reference No.UDC 66.067.002.2, that a higher rate of filtration may be achieved by minimizing the thickness of any deposit layer on the filtering partition wall. That Russian paper refers to filtering equipment in which no deposit layer arose which would appear similar to that mentioned above in connection with U.S. Pat. No. 3,437,208. Thus, the Russian paper refers to a filtering process accroding to which a suspension was continuously passed through a narrow channel between two filtering partition walls, one wall rotating while the other was stationary, and mentions a forming deposit layer on the filter being remixed with the suspension by the turbulent flow and centrifugal force caused by the rotating wall. Filtering is said to be or have been accomplished virtually without any deposit layer on the filter, either by means of a cloth with pores into which solid particles penetrated or by means of a fabric with a thin coating. The coating contemplated is unclear, but reference may have been to a precoated filter fabric such as that taught for example in U.S. Pat. No. 3,643,806.

As mentioned, disclosures of the various devices heretofore used for dynamic filtration teach generally that the filter element is either to be kept as clean as possible during use, or that the filter element is to be cleaned periodically such as by backwashing during a shutdown of the apparatus. Indications heretofore have been that should a filter cake layer of any significance build up on the filtering elements, the increased pressure difference across the filter diaphragms may result in a perforation or breakthrough of the filter diaphragm. Presumably, such a failure of the filter diaphragm might be caused by the pushing of material into the interstices of the filter cloth, the building up of a coating of filter cake on top of the cloth, the consequent pressure differential across the filter cloth, and the strength limitation of the filter cloth. As a result prior devices have generally been limited to operation with fluid pressures of less than 150 pounds per square inch (psig). Further, with heretofore known devices, if and as a filter cake built up over a period of time on the filtering diaphragm the output of such devices began to decrease, which condition has up until now generally been alleviated by backwashing or cleaning of the filtering diaphragm with an attendant diminution of overall filtration rate.

As a result of the need to periodically clean the filtering diaphragm, operation of prior dynamic filtration devices has usually been carried out on an intermittent or sequential basis, thereby limiting the overall throughput of the device in a given period of time. Also the filtrate from the next cycle will tend to be clearer (or cloudier) than the filtrate from the earlier cycle. Thus, for example, where a device is filtering for only 2 or 3 minutes followed by cleaning and subsequent filtering, the system is not operating under ideal conditions. In this regard, where a concentrated suspension or slurry has been discharged from prior dynamic filtration devices, a control valve has frequently been employed to control the opening and closing of the discharge pipe for the slurry. With prior filtration devices, such a discharge control valve has usually been closed for a longer period of time than it has been opened in order to allow the slurry or suspension to become concentrated within the filtration device before a discharge of the slurry from the device. As a result, such prior filtration devices have been subject to the possible occurrence of a hydraulic shock within the pressure chamber during the opening and closing of the discharge control valve.

Further, in the case of prior art devices utilizing rotating filter discs such as that described in the previously mentioned U.S. Pat. No. 3,437,208, a high rotational speed of the discs has been found to cause a "bleeding" of the filter elements, i.e., to cause solids to pass through the filter media with the filtrate, especially in the case of solids-containing fluids having small-sized solids therein. Prior art devices utilizing rotating members have also in some cases been limited to relatively low rotational speeds due to the fact that excessive speeds of the rotating bodies have created undue agitation and turbulence in the solids-containing fluid being processed, and in turn an erosion or cavitation effect upon the filtering diaphragms, which can be another cause of breakthrough or other damage to a filtering diaphragm. Upon the occurrence of a breakthrough of a filtering diaphragm, a complete shutdown of the device and a cleaning out of the filtrate outlets has been required to avoid contamination of the filtrate with solids during subsequent use, thereby reducing the overall productive operational time of the filtration device. Because such prior dynamic filters have been limited in terms of maximum employable fluid pressures and in terms of the rotational speeds of the various rotating bodies, and, in particular, because of frequent off and on cycles, the overall size and throughput of such prior devices have been limited.

OBJECTS OF THE INVENTION

Accordingly, it is an object of this invention to provide an apparatus and process which can operate on a continuous basis for separating a concentrate of solids and a filtrate from a solids-containing fluid.

It is a further object of this invention to provide a concentrator having filtering surfaces which are protected against hydraulic abrasion.

It is a further object of this invention to provide a concentrator capable of operation at high pressures.

It is a further object of this invention to provide a dynamic, rotor-type concentrator capable of operation with high rotor speeds.

It is a further object of this invention to achieve filtration by the autogeneous and permanent formation from the fluid being processed of a filter cake layer which itself serves as a filter medium.

It is a further object of this invention to provide a concentrator which can process solids-containing fluids without requiring cleaning washes of the filtering surface during operation of the concentrator.

It is a further object of this invention to provide a simple, economical and efficient concentrator.

It is a further object of the invention to provide a concentrator which can operate continuously without any significant reduction in throughput.

SUMMARY OF THE INVENTION

Briefly, the invention provides a concentrator for separating a concentrate of solids and a filtrate from a solidscontaining fluid in which a porous, dense and generally friable filter cake layer of predictable thickness is initially built up and then positively maintained on a filtering surface of a filter element during continued operation of the concentrator. In one capability, the filter cake layer protects the filtering surface against erosive and hydraulic scrubbing forces of the fluid within the concentrator. In another capability or operational attribute the filter cake layer serves as a filtering medium for the solids-containing fluid being processed within the concentrator. Generally, at the very beginning of operation of a concentrator embodying this invention some of the solids material which is to be filtered may pass through the filter cloth or other filter surface. As the filtering operation continues, a layer of solids material gradually accumulates which adheres to the exposed surface of the filter. This layer serves to protect the filter diaphragm or cloth from the hydraulic forces exerted by the fluid being rotationally driven by vanes on the rotor disc. The outside or exposed surface of the filter cake layer is scrubbed hydraulically by the solids-containing fluid within the concentrator, and this scrubbing serves to deter a further build-up of material on the filter element.

The thickness of the filter cake layer may vary depending upon the type of solids-containing fluid being processed. However, up to the present time, for those fluids which have been processed as described below in examples of the use of this invention, the filter cake layer has been of a thickness of about 1/16 to 1/32 inch on the stationary filter element adjacent the slurry discharge end of the concentrator, and sometimes somewhat less on upstream filter elements in an apparatus with a plurality of filter elements.

It has been found that with no breakthrough of the filter cloth or diaphragm or undesirable penetration of solids past the filter medium, a high fluid pressure can be employed and a significantly greater throughput of filtrate discharge per square foot of filtering surface can be obtained with use of the filter cake layer than without. For example, operation at high fluid pressures in the range of from 100 to 400 psig aids in the formation of a compacted friable filter cake layer. Since the filter cake layer serves as a protective layer for the filter cloth or element, higher rotational speeds of the rotor can be utilized. For example, in a concentrator having a filtering surface with a filter cloth and an outer diameter of from 6 to 96 inches, rotor speeds of from 20 to 2,000 rpm can be employed along with fluid pressures in excess of 200 psig. depending upon the diameter of the rotor. If a rotor speed in the range between 985 and 1,050 rpm be used, the rotor may be about 35 feet per second (f.p.s.).

In one embodiment, a concentrator according to the present invention has a housing which defines an enclosed separation chamber, and inlet to that housing for the introduction into the separation chamber of a pressurized solids-containing fluid, at least one stationary filter element within the separation chamber which has at least one filtering surface for permitting flow of a filtrate therethrough from a solids-containing fluid together with a suitable drainage system for removal of filtrate from the separation chamber and housing, and an outlet from the housing for discharging a concentrated slurry of solids leaving the filter element. The concentrator of this embodiment further has a rotor including a shaft which is rotatably mounted on a longitudinal axis within the separation chamber coaxially of the filter element. This rotor customarily has a plurality of radial, most simply solid discs each usually with a plurality of blades or vanes which project laterally toward the filtering surface of an adjacent filtering element and in the general direction of the longitudinal axis of the rotor. The blades are spaced from the filtering surface to permit the autogenous initial build-up and subsequent maintenance during operation of the concentrator of a porous, generally friable filter cake layer over the filtering surface. Basically, to be sure, the rotor may be constructed as a shaft carrying just one disc of solid construction on just one face of which there is only a single vane or blade. The blades are preferably curved across the face or faces of their disc or discs so as to promote a sinuous flow of the fluid making its turns through the small annular passages between the rotor shaft and each filter element at the inside and around the peripheries of the rotor discs at the outside. Each filtering element can comprise filter cloth or any other suitable filter material and an appropriate structural support and drainage system therefor.

A concentrator according to this invention will be constructed most effectively in the majority of practical employments with a plurality of filter elements and a plurality of rotatable discs which are disposed coaxially in an alternating manner. In such a case, the filter elements can be spaced apart a greater distance near one or both of the respective ends of the chamber than in the intermediate part of the chamber. Also, the spacing of the filter elements can be varied with, for example, the spacing increasing from each respective end of the separation chamber towards the intermediate part of the chamber. Further, the radial elements of the rotor which are positioned between two filter elements can be provided with blades on both faces to build up filter cake layers on two sides of the filter elements.

Each filter element has a pair of opposed filtering surfaces which cooperate with various passageways formed interiorly of the filter element for conducting a flow of filtrate through the filter element and out of the concentrator. Each filter element can be made as a disc-like structure with a central aperture for passage of a shaft on which the solid rotor discs are carried. Each rotor disc can also be provided with circumferentially spaced openings about the shaft which carries the rotor discs to permit a portion of the fluid in the concentrator to flow therethrough.

The invention further provides a method of obtaining a concentrated slurry of solids from a solids-containing fluid. The method includes the steps of mounting a filter element having a filtering surface in a relatively stationary position; positioning an optionally solid rotatable member such as a separation or guide disc coaxially with and spaced from the filter element to define a flow path for the fluid therebetween; forming a filter cake layer of predetermined thickness over the filter surface during the initial rotation of the rotatable member or rotor relative to the filter element, and maintaining that thickness of cake layer during continued rotation of the rotor without further thickening of the layer. In order to maintain the thickness of the filter cake layer, a surge or compression wave of fluid is provided which continuously moves radially and circumferentially across the surface of the filter cake layer in front of the oncoming rotor blades during turning of the rotor. In that way the thickness of the filter cake layer is maintained by the hydraulic scrubbing of the filter cake layer under the action of the wave. This wave is created by the action of the blades which extend from the surface of the rotor disc toward the filter element. The spacing of these blades from the filter element is such as to permit the build-up of the filter cake layer but still provide or cause a space to remain between the hard friable surface of the filter cake layer and the blade edges sweeping angularly across it as the rotor is turned during steady operation of the apparatus. This space may have a highly concentrated slurry between the thinner slurry in the middle of the specific annular volume and the friable cake built up on the filtering surface.

During operation of the concentrator, filtrate is continuously filtered through the filter cake layers and filter elements and out of the housing, while retained solids are returned to the fluid within the concentrator to cause a thickening of the fluid. As the fluid moves through the concentrator, it is continuously thickened in passing through and from one subchamber defined between filtering elements to a downstream subchamber similarly defined. Upon reaching an end zone of the separation chamber, the thickened or concentrated fluid passes through the outlet in the housing of the concentrator and is then collected in a suitable gathering vessel or other accumulation or processing device.

The concentrator may further be provided with one or more ploughs on the outer periphery of each of the radial or disc elements of the rotor. The ploughs extend outwardly of the radial elements into the flow path of a solids-containing fluid passing across the rotor's outer periphery. Each plough is sized to extend into the annular volume or region generally defined by the circumferential periphery of a radial element of the rotor, two adjacent filter diaphragms or other surfaces on either side of the rotor, and an inner surface of the casing or housing of the concentrator. During rotation of the rotor, the ploughs serve to create sufficient turbulence within the fluid flow path to mitigate or to overcome any tendency for centrifugal force generated in the fluid by the rotor to build up an accumulation of solids between the filter surfaces at points radially remote from the rotor periphery, such as adjacent the outer wall of the concentrator or at the outer radial corners of adjacent filter diaphragms.

As the apparatus of this invention provides means for both concentration of solids into a thickened slurry and the obtaining of a filtrate, the terms "concentrator" and "filter" are each used generically herein with reference to the invention, such that each includes filtration apparatus wherefrom a usable filtrate is desired as well as concentrators wherefrom a usable concentrate is desired as an output.

BRIEF DESCRIPTION OF THE DRAWINGS

The nature and substance of the present invention as well as its objects and advantages will be more clearly perceived and fully understood from consideration of the following detailed description and appended claims taken in conjunction with the accompanying drawings in which:

DESCRIPTION OF THE PREFERRED EMBODIMENTS

Figure 1:
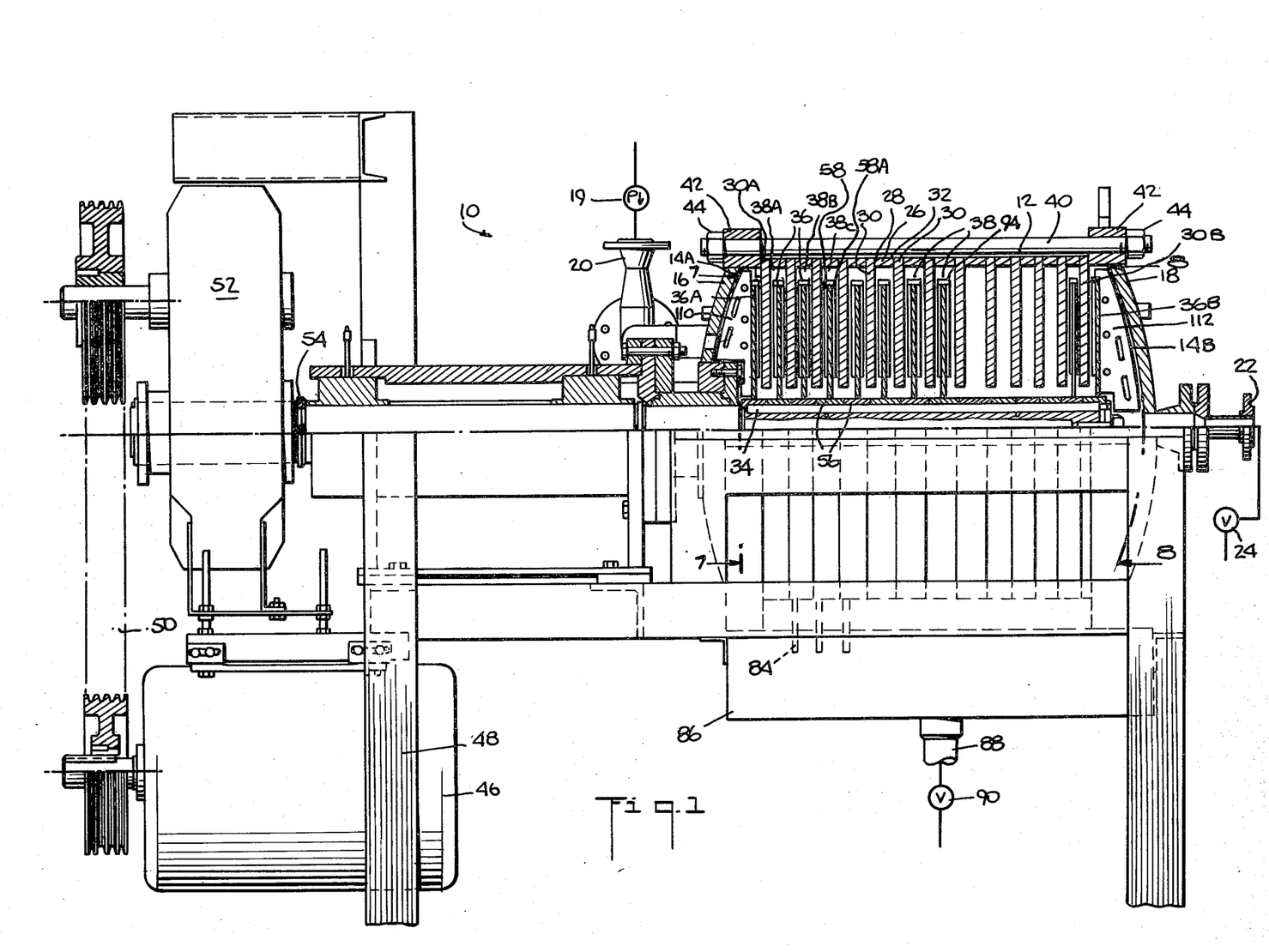
FIG. 1 is a side elevation view, partly in cross-section, of a concentrator according to this invention which includes a plurality of coaxially mounted rotor disc elements and filter elements.

Referring now to the drawings in detail, the concentrator 11 illustrated in FIG. 1 is constructed with a composite or built-up housing 12 which defines a separation chamber 14 and is provided with a pair of end plates 16, 18 at the opposite ends. The front end plate 16 is provided with an inlet spigot or opening 20 while the rear end plate 18 is provided with an outlet spigot or opening 22. In addition, the outlet spigot 22 has a control valve 24 such as a manually operated valve mounted thereon to control the flow of material from the outlet spigot. The housing 12 as shown in FIG. 1 is made up of a series of spacer rings 26 each of which has annular side 28 secured as by welding to one adjacent filter element 30, and an opposite annular side 32 which abuts another adjacent filter element 30. The spacer rings 26 and filter elements 30 are mounted in alternating fashion to peripherally define the separation chamber 14, with each filter element 30 except one filter element 30B near the rear end plate 18 having a spacer ring secured to it forming a unitary assemblage of a filter element 30 and spacer ring 26.

A rotor shaft 34 passes through the front end plate 16 of the housing 12 and terminates within the separation chamber 14 at a point spaced from the rear end plate 18. A plurality of radially extensive elements 36, 36A and 36B are mounted on the rotor shaft 34 within the separation chamber 14 in a secured manner as by a key to be rotated with the shaft 34. The radial elements 36, 36A and 36B are in the form of bodies of solid construction such as separation discs, guide discs or the like, and are disposed in alternating fashion with the filter elements 30. Each radial element 36 other than the elements 36A and 36B near the front end plate 16 and the rear end plate 18 of the concentrator is generally within a subchamber 38 bounded by a unitary assemblage of a filter element 30 and a spacer ring 26 and by a surface of an adjacent filter element 30. Each radial rotor element 36 including 36A and 36B is disclike in general configuration with an outer diameter which is less than the inside diameter of the concentric spacer rings 26. Further, each rotor disc 36, 36A and 36B is spaced longitudinally from the adjacent end wall 16 or 18 and/or from adjacent filter elements 30, 30A. This spacing helps provide a flow path for a solids-containing fluid from the inlet spigot 20 through the separation chamber 14 to the outlet spigot 22, the flow path being generally indicated by arrows in FIG. 1. This spacing also permits the thin friable cake to be generated and maintained.

The rotor discs 36A and 36B, positioned adjacent front end plate 16 and rear end plate 18, are provided with turbulators 110 and 112. As shown in FIG. 1, turbulator 110 has a generally triangular shape adapted to conform to the cross-sectional profile of the chamber 14A formed between front end plate 16 and filter element 30A. Turbulator 112 is similarly constructed and designed to generally conform to the cross-sectional profile of the chamber 14B, formed between rear end plate 18 and filter element 30B. Both turbulators 110 and 112, while generally conforming to the contour of chambers 14A and 14B, are displaced away from the interior of chambers 14A and 14B to provide a small spacing between the turbulators 110 and 112 and the end plates 16 and 18. By spacing the turbulators away from the interior of the end plates 16 and 18, a close running clearance is provided between the turbulators and the interior of the end plates 16 and 18 and their peripheral boundaries. Additionally both turbulators have lateral openings 106 and 108 to permit fluid flow through the turbulators during the rotation of the discs, discussed further infra.

Referring still to FIG. 1, the spacer rings 26 and the filter element 30 to which each spacer ring is respectively secured as by welding are assembled to form a unitary housing 12. A plurality of elongated bolts 40 in the nature of tie rods threaded at each end are passed through loops or other openings on the outside of each assemblage of filter elements 30 and spacer ring 26 to align the filter elements 30. The end plates 16, 18 of the concentrator are provided with suitable bosses 42 to receive the bolts. Locking nuts 44 are threaded on the ends of the bolts 40.

A drive motor 46 mounted on a frame 48 is provided outside of the housing 11. The drive motor 46 is coupled by V-belts 50 to a speed controller 52 also mounted on the frame 48, and the speed controller 52 is in turn coupled to a drive shaft 54 which is coupled to the rotor shaft 34 of the concentrator 11 through suitable bearings and seals. By means of the motor 46 and speed controller 52 the rotor shaft 34 can be driven at preselected speeds. The speed controller 52 is manually controllable and/or it can be automatically governed by a mechanical coupling to the rotor shaft 34 which causes a variation in the speed of the motor 46 as a function of the torque, i.e., resistance to turning, which is imposed upon the rotor shaft 34 by the solids-containing fluid through which the rotor discs turn.

Figure 2:
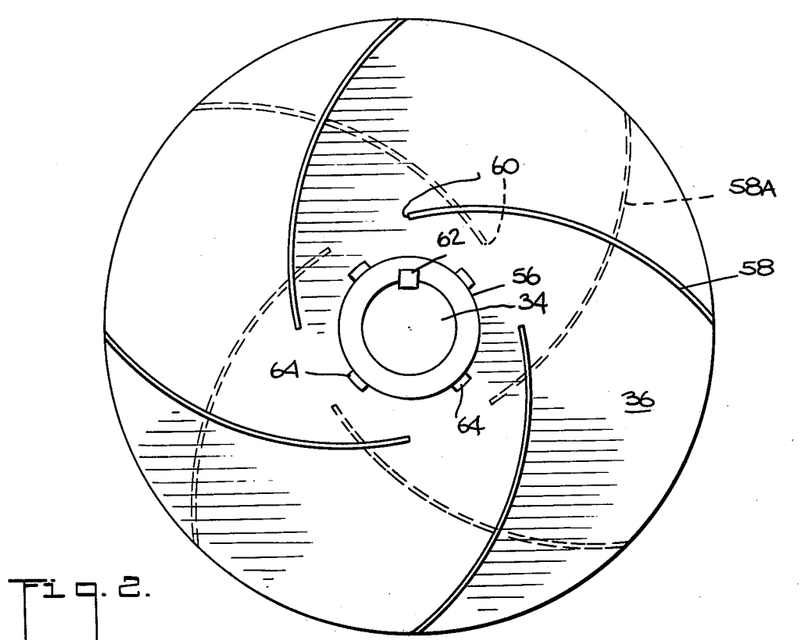
FIG. 2 is an end elevation or face view of a rotor disc element according to the invention.

As shown in FIGS. 1 and 2, each radial rotor element 36, 36A and 36B is secured as by welding to a collar 56 mounted on the rotor shaft 34. Each rotor element 36, 36A and 36B is provided with four or more equally spaced blades or vanes 58, 58A on each of its radial surfaces which project from the respective radial surface of the rotor elements towards an adjacent filter element 30, 30A or 30B when the rotor element is in place in the housing 12 of the concentrator 11. The blades 58, 58A each extend in a curved path from a point 60 adjacent to but spaced apart from its collar 56 to the outer periphery of the rotor element. On the internal rotor elements 36 the curvilinear configuration of the blades 58 on one radial surface of any rotor element is the mirror image of the configuartion of the blades 58A on the opposite surface of that rotor element. Each rotor element 36, 36A and 36B and its respective collar 56 is mounted on the rotor shaft 34 such that for the intended direction of rotation of the rotor shaft, for example clockwise, the direction of movement imprarted to solids-containing fluid contacted by its blades 58, 58A on either side of the rotor element corresponds to the direction of movement of the flow path on said side of the rotor element as indicated generally be arrows in FIG. 1. Thus, for a given direction of rotation the blades on one side direct fluid circumferentially and radially outwadly of the rotor element 30 and the blades on the opposite side direct fluid radially inwardly. The rotor element 30 is mounted in the concentrator such that these directions correspond to the intended flow path adjacent the respective blades.

As shown in FIG. 1, the blades 58, 58A project laterally toward an adjacent filter element 30, 30A or end plate 16. The blades are spaced from the surface of adjacent filter elements 30, 30A by a distance of about 1/32 to 1/16 inch. Further, as shown in FIG. 2, each rotor element 36, 36A and 36B is positioned on its respective collar 56 by means of a key 62 and has four equally spaced fluid passages 64 along its periphery adjacent its collar or hub 56. These passages 64 serve to permit a portion of the solids-containing fluid within the separation chamber 14 to flow through rather than around the rotor elements 36, 36A and 36B. In other embodiments according to this invention, the passages 64 can be omitted or, alternatively, passages may be provided for flow of fluid elsewhere through the rotor discs, for example adjacent its outer periphery, to vary the flow paths and/or the turbulence and flow direction provided to the solids-containing fluid by the rotor elements 36.

Figures 7, 8, 9, 10:
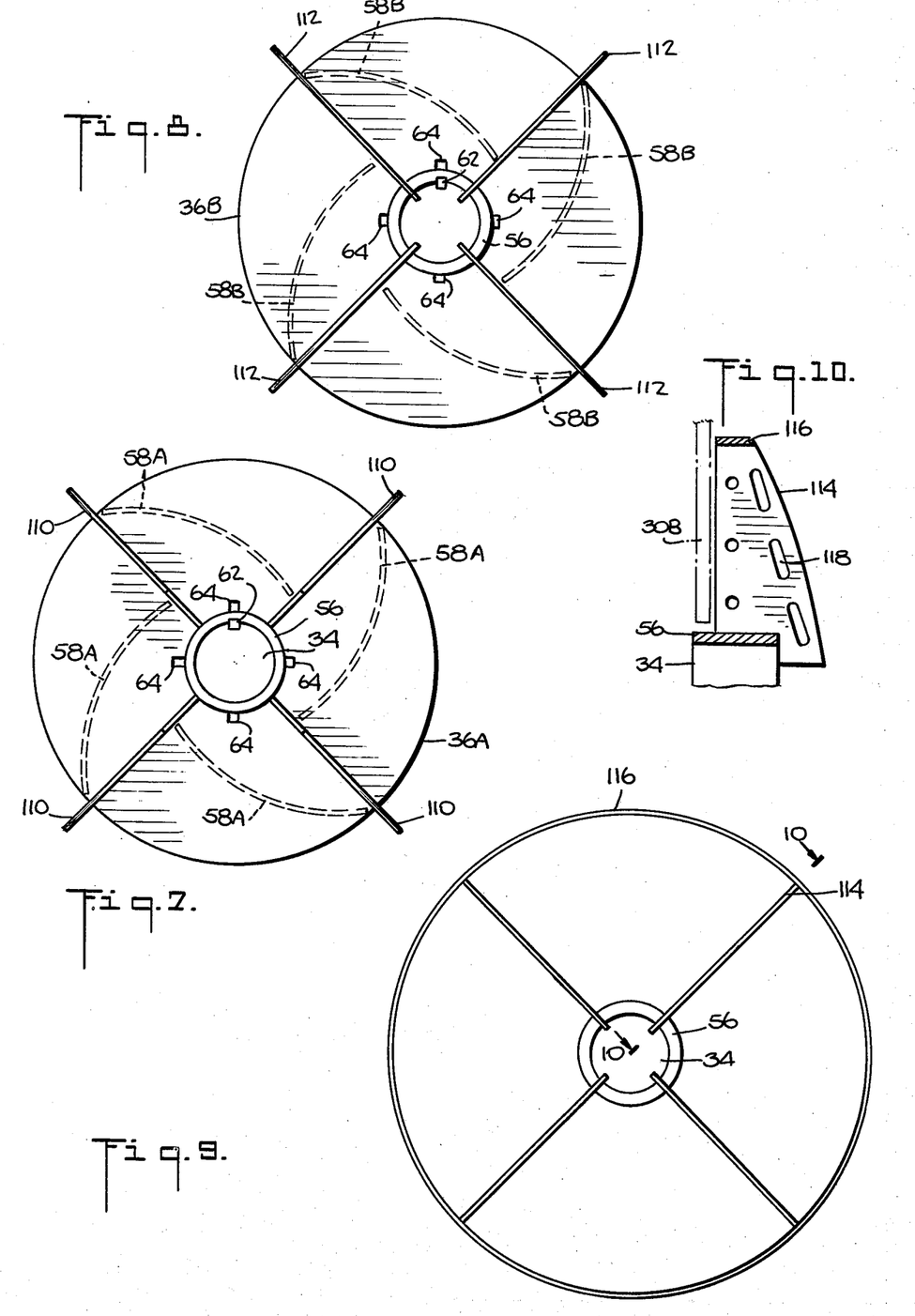
FIG. 7 is a front elevation or face view of a rotor disc element having a plurality of turbulator elements mounted thereon, as viewed from the line 7—7 of FIG. 1 looking in the direction of the arrows.
FIG. 8 is a rear elevation view of a rotor disc element having a plurality of turbulator elements mounted thereon, as viewed from the line 8—8 of FIG. 1 looking in the direction of the arrows.
FIG. 9 is a rear end elevation or face view of an alternate embodiment of the turbulator rotor assembly of FIG. 8 comprising a turbulator without the disc element of FIG. 8 and having its turbulator and vane elements combined.
FIG. 10 is a fragmentary side elevation view, partly in cross-section, along line 10—10 of FIG. 9, looking in the direction of the arrows.

Referring to FIG. 7, rotor disc 36A had turbulators 110 mounted by welding or other means to the face of the rotor disc. Rotor disc 36A in turn is secured to its collar 56 and that to shaft 34 by means of key 62 and has four equally spaced fluid passages 64 along its periphery adjacent its collar or hub 56. These passages 64 serve ths same function as the passages 64 in rotor discs 36 as shown in FIG. 2 and described above. On the reverse side of rotor 36A a plurality of equally spaced blades or vanes 58A are mounted facing filter element 30A. The curvilinear form of blades 58A provides the same direction of movement to the solids containing fluid contacted by the blades as described above for blades 58A attached to rotor elements 36, i.e., for a given direction of rotation, for example, clockwise, circumferentially and radially inwardly of the first filter element 30.

As shown in FIG. 8, rotor disc 36B has turbulators 112 mounted by welding or other means to the face of the rotor disc. Passages 64, and key 62 are also provided in conjunction with hub 56, mounted on shaft 34, and serve the same function as described for rotor 36A. On the reverse side of rotor 36B, vanes 58B face filter 30B and they serve the function of vanes 58 and 58A on rotor disc 36 and 36A. Turbulators 112 are appreciably perforated.

FIGS. 9 and 10 show a modified form of turbulator 114 used to replace rotor disc 36B and the vanes 58B. The turbulator 114 is mounted to hub 56 and has a circumferential stiffening element 116 connecting each turbulator element to provide rigidity to the assembly. Turbulator 114 has a plurality of openings 118 extending laterally through the turbulator to permit passage of solids-containing fluid through the turbulator during the rotation of the shaft 34. As shown in FIG. 10, the construction of turbulator 114 is such that it extends in close proximity to filter element 30B, to serve the function of vanes 58B in the embodiment shown in FIG. 8, i.e. to control the deposit of a filter cake upon the downstream surface of filtering element 30B.

Figure 3:
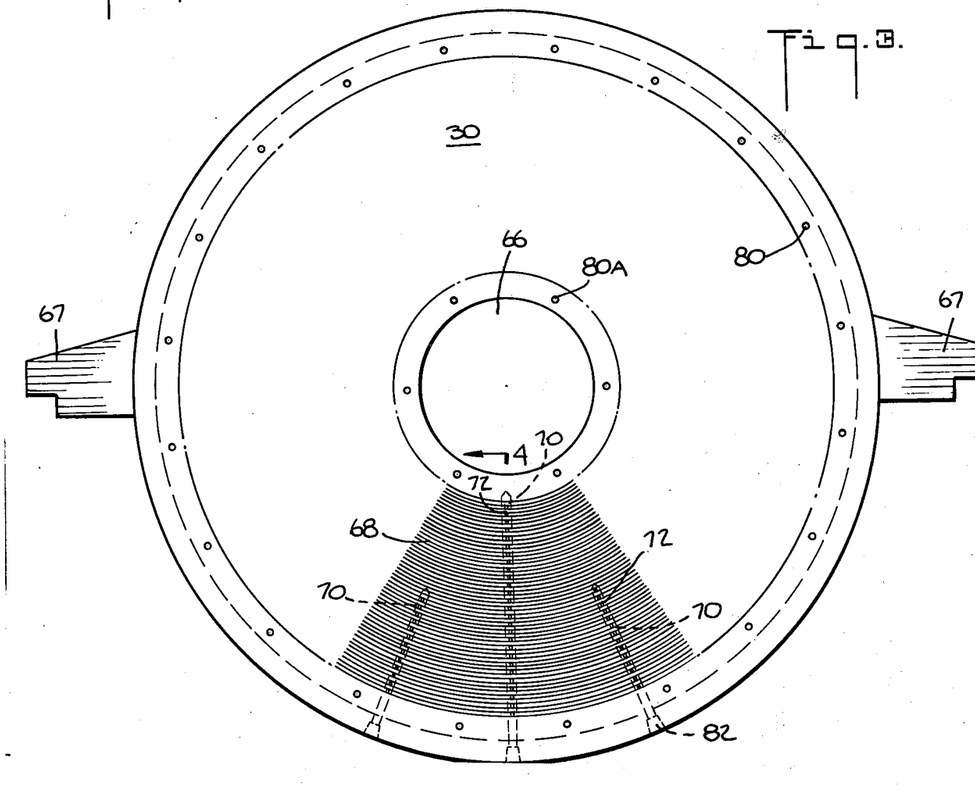
FIG. 3 is an end elevation or face view, partly fragmented, or a filter element according to the invention.
Figures 4, 5, 6:
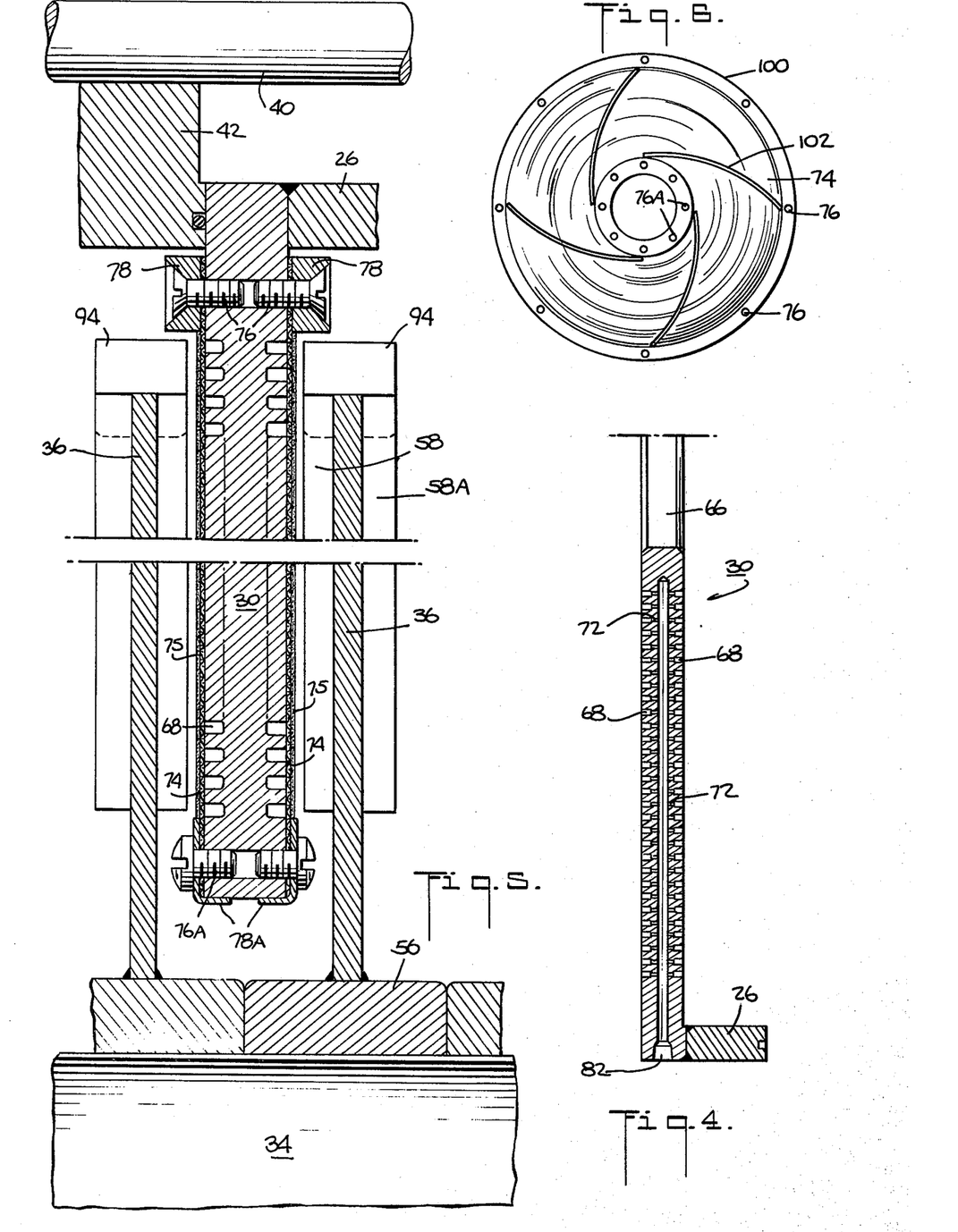
FIG. 4 is a cross-sectional view of a filtering element along the line 4—4 of FIG. 3 looking in the direction of the arrows.
FIG. 5 is an enlarged side elevation cross-sectional view of a filter element and two adjacent rotor elements with ploughs thereon.
FIG. 6 is an end elevation or face view of a further embodiment of a rotor element according to the invention comprising a filtering surface and a plurality of vanes extending across the face thereof.

Referring to FIGS. 1, 3, 4 and 5, each filter element 30 of the concentrator 11 is formed of an annular disc of generally solid construction which defines an opening 66 for passage therethrough of the rotor shaft 34 and of solids-containing fluid. Each filter element 30 has a pair of oppositely disposed lugs or ears 67 for providing vertical support and alignment of each filter element on horizontal rails (not shown) of the structural frame-work in and on which the assembled housing 12 rests. The disc 30 is characterized by a plurality of spaced-apart concentric grooves 68 on each face as well as a plurality of radial bores 70, such as for example three, which communicate with the grooves 68 through suitable openings 72. In addition, as shown in FIG. 5 each annular filter element 30 is provided with filtering surfaces 74, formed for example by filter cloths as of a polyester material, on opposite sides of the filter element. The filtering surfaces 74 are secured in place as by bolts 76, 76A to cover over the grooves 68. As shown in FIG. 5, the outer edges of the filtering surfaces 74 are held down by retaining rings 78 through which a circumferential array of bolts 76 are threaded into holes 80 in the filter element disc 30. Similarly, the inner edges of the filter surfaces are held down by retaining rings 78A of L-shaped cross-section through which an array of bolts 76A pass into holes 80A circumferentially spaced along the inner edges of the filter element disc 30. Referring to FIGS. 1 and 3, the radial bores 70 have outlets 82 which communicate by means of lines 84 into a drain pan 86 which has a discharge nozzle 88 extending outside the concentrator to carry off filtrate. A valve 90 is provided to control the flow of filtrate from the drain pan 86.

In operation, a solids-containing fluid under pressure is supplied from a pump 19 to the inlet spigot 20 for the concentrator 11. At the same time, the rotor shaft 34 is caused to rotate by the drive motor 46. The consequent rotation of the radial rotor members 36, 36A and 36B, their blades 58, 58A and 58B and tubulators 110 and 112 cause the major portion of the entering fluid to disperse about the initial rotor member 36A and thereafter to follow a flow path which meanders sinuously about the stationary filter elements 30, 30A and remaining rotor members 36 toward rotor member 36B and the outlet 22 of the concentrator. At the same time, a minor portion of the solids-containing fluid flows through the openings 64 in the rotor elements 36.

After particulate matter comes in contact with each filtering surface 74 a pressure differential is present across each filtering surface 74 of the filter elements 30, with a high pressure being present on the sides of the filtering surfaces which face the separation chamber 14 due to the pressurized condition of any fluid within the chamber, and a lower pressure being present in the internal grooves 58 and the radial bores 70. Upon initial start-up of the concentrator 11, fine solids present in the solids-containing fluid within the separation chamber 14 can at times remain suspended in the filtrate which initially passes through the filtering surfaces 74 and into the drain pan 86. However, a filter cake layer 75 (FIG. 5) shortly begins to form over the filtering surfaces 74, and upon sufficient build-up of the filter cake layer a clarified filtrate is obtained. Any filter cake layer 75 is limited in thickness, such as for example to about 1/32 inch, by the action of the blades 58, 58A and 58B on the rotor discs 36. Thus, aided by the rotation of the blades 58, 58A and 58B, the thickness of each filter cake layer 75 is maintained at a generally predictable thickness by the hydraulic scrubbing and wave action of the solids-containing fluid upon the filter cake layer 75, and the action of the blades 58 of the rotating rotor elements 36. As shown in FIG. 5, the edges of the blades 58, 58A are spaced a sufficient distance from the filtering elements to permit the build-up and maintenance of suitable filter cake layers 75 on the sides of the filter elements and at the same time, provide a clearance between the edges of the blades 58, 58A and the outer surface of the adjacent filter cake layer 75.

Additionally, turbulators 110 and 112, mounted on the rotating disc elements 36A and 36B, serve to prevent any build up of material on the interior walls of chambers 14A and especially 14B. This same function is performed by the embodiment shown in FIGS. 9 and 10 in which the turbulator is designed to replace the rotor disc 36B and vanes 58B.

The filter cake layer 75 which builds up on each filtering surface 74 serves as a protective covering for the filtering surfaces 74 against the abrasive action of the solids-containing fluid moving in the flow path of the chamber 14, and also serves as part of the filtering media for the filter elements 30. As the solids-containing fluid moves across each successive filter element 30, 30A in its flow path, the filtrate continues to pass through the respective filtering surfaces 74, then out of the interior of the filter elements through their radial bores 70 and outlets 82, and then into the drain pan 86 from which it can be removed through a discharge nozzle 88. Also, any excess solids material which may tend to be deposited on the filtering surfaces 74 is hydraulically scrubbed by the solids-containing fluid within the concentrator 11 and returned to the fluid, thereby increasing the concentration of the solids-containing fluid to form a thickened slurry for subsequent removal from the concentrator through its concentrate outlet spigot 22.

For controlling the discharge of the thickened slurry or concentrate, a valve 24 is connected by suitable piping after the discharge of spigot 22. This control valve 24 would generally be closed during the initial start-up of the concentrator 11 until sufficiently thick filter cake layers 75 have built up on the filtering surfaces 74 within the concentrator or until the solids-containing fluid within the chamber 14 has been initially thickened. This period of initial closing of the control valve 24 can be reduced if not omitted when the concentrator is being started up following an overnight shutdown and filter cake layers 75 are already present on the filtering surfaces. After the initial start-up period, the control valve 24 is opened so that the concentrated slurry can be moved out of discharge spigot 22 under the pressure existent in the chamber 14.

As the operation of the concentrator 11 continues, fresh pressurized fluid is continuously supplied through the inlet spigot 20 from the supply pump 19, while filtrate from this fluid within the separation chamber 14 is continuously removed through discharge spigot 88 and a thickened slurry or concentrate is continuously removed through outlet spigot 22. The rate of feed of fluid to the inlet spigot is controlled by suitable controls on the pump 19. The rate of concentrate discharge is controlled by the mentioned control valve 24 on its discharge line 22. The valve 90 controls the rate of filtrate flow from collecting pan 86. Accordingly, in operation valve 24 controls the concentration of the cake and the mass balance must be such that the flow out of the cake must match the feed rate of pump 11 minus the filtrate output through valve 90.

The filter cake layers 75 on the filtering surfaces 74 of the filter elements 30 are continuously maintained during operation. These filter cake layers 75 are characterized by the feature that each is of a substantially porous and in most cases friable nature. Thus, should operation of the concentrator 11 be stopped after the filter cake layers 75 have been formed, and the concentrator disassembled for inspection, it would be seen that in most cases the filter cake layers 75 are relatively brittle or friable and that they can be stripped in large pieces from their respective filtering surface 74, with the portion of each cake layer 75 adjacent the respective filtering surface being relatively dry except for filtrate passing through the cake layer 75 possibly remaining in its pores. The generally friable nature of the filter cake layers 75 and their relative ease of removal from the filtering surfaces 74 eases the cleaning of the filter elements 30 should such become necessary, such as when the concentrator 11 is to be cleaned for use with a different solids-containing fluid.

As shown in FIG. 1, separation chamber 14A is defined by front end plate 16, shaft 34 and filter element 30A. Similarly, separation chamber 14B is defined by rear end plate 18, shaft 34 and filter element 30B. Within separation chamber 14A rotor element 36A has turbulators 110 mounted to the front face of the rotor element 36A with vanes 58A mounted to the reverse side, as shown in FIG. 7. As shown in FIG. 8, rotor element 30B has turbulators 112 and vanes 58B mounted on opposite sides. Both the chambers 14A and 14B as well as the turbulators 110 and 112 can be shaped and sized in varying volumes. As the shape of either chamber 14A or 14B is changed, the design of the turbulators 110 and 112 will also be changed to provide the desired clearance between the turbulators 110 and 112, the respective end plates 16 and 18, shaft 34 and other adjacent structure.

Referring to FIG. 1, the filter elements 30 and spacer rings form successive subchambers 38A, 38B, 38C and the like within the separation chamber 14. In the embodiment of this invention illustrated in FIG. 1, there are provided twelve successive subchambers 38 bounded on either side by a surface of a filter element 30, with the filter elements 30 being equally spaced from each other within the concentrator 11, and the radial rotor members 36 also being equally spaced from each other. However, the successive subchambers can also be sized to be of varying volume. To this end, the respective radial elements 36 and filter elements 30 can be spaced apart at different spacings throughout the housing 12 with, for example, a greater spacing apart of the filter elements 30 at one or both ends of the housing 12 than within an intermediate part of the housing 12. Alternatively, the spacing apart of the filter elements 30 toward the upstream end of the housing 12 can be greater than in the remainder of the housing 12, which arrangement might be useful in a case where the fluid is of a relatively low initial concentration. Also, the width of the subchambers 38 can vary in a pattern in which the subchambers 38 become wider from the respective ends toward the middle of the housing 12. In the embodiment of this invention illustrated in FIG. 1, the twelve subchambers 38 bounded on each side by the filter elements vary in width, with the first and last two subchambers 38 (i.e., the two subchambers closest to front and rear end plates 16 and 18 respectively, being about 2 1/4 inches wide and about 24 inches in outer diameter and each successive pair of subchambers 38 increasing toward the center of the apparatus in width by about 1/8 inch. In the case where the subchambers 38 are decreased in width, the filter elements 30 and the rotor elements 36 can also be varied in thickness or remain constant in thickness.

As can be seen in FIG. 1, the solids-containing fluid within the concentrator 11 passes through the separation chamber 14 by moving outwardly between turbulators 110; making a U-turn around the outer edge of rotor element 36A and then moving inwardly along the downstream side of that element between it and filter element 30A. The solids-containing fluid then turns around the inner edge of filter element 30A and passes outwardly between the downstream face of that element and the upstream face of the second rotor disc element; then around the outer periphery of the latter element, and so on sinuously and with increasing solids concentration through and out of the concentrator. The blades 58, 58A on opposite sides of the rotor elements are substantially mirror images of each other and are so related to each other as to impel the fluid mass radially outwardly and inwardly on the sides of the rotor elements 36 in conformance with the flow path for the fluid. Referring to FIG. 2, in the illustrated embodiment of this invention the rotor elements 36 are provided with a plurality of openings or passages 64 which are circumferentially spaced about the inner boundary of each rotor element 36. Such openings 64 provide a further flow path for a minor portion of the solids-containing fluid. This path of fluid flow serves to mitigate fluid pressure differences and provide a washing action within the separation chamber 14 and within each subchamber 38.

Referring to FIGS. 1 and 5, each rotor element 36 may be provided with one or more ploughs 94, for example four, which are equally spaced about the periphery of the rotor element 36. Each plough 94 is of flat plate-like shape and is secured to its respective rotor element 36 ad by welding to extend radially from the rotor element while being disposed transversely to the radial plane of that element. Each plough 94 extends from its respective rotor element 36 to a point near the inside surface of a spacer ring 26 while also being spaced laterally from an adjacent filter element 30 (FIG. 5). For example, for a separation chamber 14 of a diameter of 24 inches measured as the inside diameter of a spacer ring 26, and for a filter element diameter of 21⅜ inches, the ploughs 94 extend to within 1/16 inch of the inside surface of the spacer ring 26. Each plough 94 may be disposed at a slight angle of for example 15° to a plane normal to the radial plane of its rotor element 36 or be disposed within such normal plane. Additionally, rotor elements 36A and 36B may be provided with similarly oriented plough elements 94 extending to points near the inside surface of the separation chamber 14 or front and rear end walls 16 and 18, and spaced laterally from the adjacent filter elements 30A and 30B. Circumferentially the sets of ploughs may be located offset at various angles from or even essentially in line with the vanes and turbulators on the rotor discs with which the ploughs are associated. Those relationships are not critical.

During operation, as the radial elements 36, 36A and 36B rotate there is a flow of solids-containing fluid across the filtering surfaces of the filter elements 30, 30A and 30B from one side of each radial element 36 to the other as indicated in FIG. 1. During such operation, the movement of the ploughs 94 and turbulators 110 and 112 through the flow path of the solids-containing fluid causes turbulence in the regions between the turbulators 110 and 112 and the inner surface of the front and rear end plates 16 and 18, as well as between the spacer rings 26 and the outer periphery of the rotor elements 36. This turbulence tends to overcome any tendency of solids in the solids-containing fluid to accumulate in the remote areas or corners of the chambers 14, 14A and 14B outside the circumferential periphery of the turbulators and rotor elements such as adjacent the spacer rings 26 or the filter elements 30, and to cause such solids to return into the main flow path. In one capability, the turbulators 110, 112 and ploughs 94 act as scrapers to dig out accumulated solids material from various places such as the surfaces of end plates 16, 18 and from around the bolts 76 and retaining rings 78 used to secure the filtering surfaces. In another capability, the turbulators 110, 112 and ploughs 94 act as agitating devices to create turbulence in the flow of the fluid to deter settling out of solids in the corners of the chambers 14, 14A and 14B and between the filter elements 30. In still another capability, the turbulators and ploughs 94 cause the fluid within the chambers 14, 14A and 14B to itself act as a washing and abrading medium to assist in cleaning the interior corners of the concentrator during its passage of the concentrator and also to deter an accumulation of solids. It has been found that operation of an actual apparatus embodiment of this invention of the nature of a concentrator 11 can be maintained in a steady state manner. That is, the filtrate flow volume remains steady over the course of operation as long as the pressure remains steady.

In FIG. 6 there is illustrated a further embodiment of this invention wherein a filter element 100 generally as described with reference to the embodiment of FIGS. 1–4 is provided with a plurality of vanes 102 extending across the face of each of its filtering surfaces 74. The vanes 102 extend between bolts 76 along the outer periphery of the filter element and bolts 76A along its inner periphery. The filter element of the embodiment of FIG. 6 is mounted to the rotor shaft 34 and is rotatable therewith. The filter element 100 can be coaxially mounted on the rotor shaft in alternating fashion with stationary filter elements 30 such as described with reference to the embodiment of this invention of FIG. 1, or the filter elements can be coaxially mounted in alternating fashion with stationary elements of solid construction which provide a flow path for the solids-containing fluid within the concentrator. The blades 102 on the rotating filter members serve to maintain movement of the fluid within the concentrator as well as to protect its filtering surfaces 74 by maintaining a spacing between its filter surfaces 74 and any confronting coaxial filter elements or elements of solid construction.

In order to more particularly point out the invention, reference will be made to various examples of different solids-containing fluids that were passed through a concentrator constructed in accordance with the invention. The concentrator employed for the below-described examples comprised six stationary filter elements 30, each having a filtering surface of conventional filter cloth on each side with an outer diameter of approximately 5½ inches. The concentrator further comprised a rotor having seven radial elements 36 coaxially spaced in alternating relation with the filter elements 30. Each radial element 36 had an outside diameter of 5⅝ inches and carried four blades 58, 58A on each side of the disc. The blades were in facing relation to and spaced about 1/16 inch from an adjacent filtering surface. Each radial element 36 also had two ploughs 94 equally spaced on its outer periphery extending radially outwardly of the radial element. The separation chamber of the concentrator had a diameter of about 5⅞ inches.

EXAMPLE 1

A chromium hydroxide slurry which had caused filter bleeding in prior art devices was used. Slurry at a temperature of 80°F and with an 11% solids content was fed into the concentrator under a pressure of 100 psig with the rotor of the concentrator turning at 1,050 rpm. A filtrate output of 0.151 gallons a minute and a solids concentrate output of 0.26 pounds a minute were obtained per square foot of filter surface. The solids concentrate discharged from the apparatus had a 39% solids content. The filtrate was clear and no material bleeding of solids into the filtrate occurred.

EXAMPLE 2

The chromium hydroxide test of Example 1 was re-run with an increase of pressure to 200 psig and a decrease of the solids content of the feed material to 9%. A filtrate output of 0.204 gallons a minute and a solids concentrate discharge of 0.235 pounds a minute were obtained per square foot of filter surface. The solids concentrate discharged had a 38% solids content. The filtrate was clear and no material bleeding occurred.

EXAMPLE 3

The chromium hydroxide test of Example 1 was re-run with the only change being an increase of pressure to 300 psig. A filtrate output of 0.224 gallons a minute and a solids concentrate discharge of 0.34 pounds a minute were obtained per square foot of filter surface. Whereas the slurry fed into the concentrator had an 11% solids content, the solids concentrate discharged from the apparatus had a 47% solids content. The filtrate was clear and no material filter bleeding occurred.

EXAMPLE 4

A chromium hydroxide slurry at a temperature of 110°F and an 8% solids content was fed into the concentrator under a pressure of 100 psig with the rotor of the concentrator turning at 985 rpm. A filtrate output of 0.155 gallons a minute and a solids concentrate discharge of 0.41 pounds a minute were obtained per square foot of filter surface. The solids concentrate discharged had a 35% solids content. The filtrate was clear and no material bleeding occurred.

EXAMPLE 5

The chromium hydroxide test of Example 4 was re-run with an increase of pressure to 200 psig and a decrease of the solids content of the feed material to 6%. A filtrate output of 0.254 gallons a minute and a solids concentrate discharge of 0.235 pounds a minute were obtained per square foot of filter surface. The solids concentrate discharged had a 34% solids content. The filtrate was clear and no material bleeding occurred.

EXAMPLE 6

The chromium hydroxide test of Example 5 was re-run with an increase of pressure to 300 psig. A filtrate output of 0.294 gallons a munite and a solids concentrate discharge of 0.228 pounds a minute were obtained per square foot of filter surface. The solids concentrate discharged had a 33% solids content as compared to the 6% solids content of the feed slurry. The filtrate was clear and no material bleeding occurred.

EXAMPLE 7

A chrome dioxide slurry was used which had caused bleeding of solids into the filtrate in prior art devices due to the presence of very fine particulate matter in the slurry. The feed slurry was at a temperature of 80°F and had a 2.9% solids content when fed into the concentrator under a pressure of 270 psig. The rotor of the concentrator was turning at 985 rpm. A filtrate output of 0.415 gallons a minute and a solids concentrate discharge of 0.094 pounds a minute were obtained per square foot of filter surface. The solids concentrate discharged had a 45% solids content as compared to the 2.9% solids content of the feed slurry. The filtrate was completely clear indicating no significant bleeding of solids into the filtrate.

EXAMPLE 8

The chrome dioxide test of Example 7 was re-run with an increase of pressure to 300 psig, an increase of temperature to 110°F and a decrease in the solids content of the feed slurry to 2%. This resulted in a filtrate output of 0.537 gallons a minute and a concentrate discharge of 0.108 pounds a minute per square foot of filter surface. The solids concentrate discharged had a 54% solids content and the filtrate was completely clear.

EXAMPLE 9

An iron hydroxide slurry which had caused filter blocking in prior art devices was used. Iron hydroxide at a temperature of 75°F and a 4% solids content was fed into the concentrator under a pressure of 375 psig, with the rotor of the concentrator turning at 985 rpm. A filtrate output of 0.138 gallons a minute and a solids concentrate output had a solids level of 26%. No material blocking of the filter surfaces occurred.

EXAMPLE 10

The iron hydroxide test of Example 9 was re-run with an increase in temperature to 100°F and a decrease to 3% in the solids content of the feed slurry. A filtrate output of 0.284 gallons a minute and a solids concentrate output of 0.26 pounds a minute per square foot of filter surface were obtained, with the solids concentrate having a 24% solids level. No material blocking of the filter surfaces occurred.

EXAMPLE 11

A chromium hydroxide slurry at a temperature of 81°F and with a 1% solids content was fed into the concentrator under pressure of 375 psig with the rotor of the concentrator turning at about 1,300 rpm. A unit filtrate output time of about 60 seconds per liter was required at the beinning of the test and that output time improved by decreasing to about 50 seconds per liter after the first day of operation and following an overnight shutdown of the concentrator. The machine needed no dismantling after the overnight shutdown. The test was continued for 5 days without any decrease in the rate of filtrate output, that is without rise in unit filtrate output time.

Other tests were run with a slurry of a food additive, with a slurry of paint pigment and with a slurry of lime scrubbing products of power plant emissions from which $SO_2$ gas had been scrubbed. In each case steady state and continuous concentration was obtained with satisfactory throughput rates and satisfactory concentration of solids.

CONCLUSION

From place to place in the foregoing description of the present invention, the expressions "filter element" and "filtering surface," have been used in connection with the physical components and the operational conditions of the concentrator described herein. It is to be understood that these expressions have been used only for the sake of convenience and clarity to identify and describe particular components of a compound machine. For purposes of this specification, including its claims, the expressions are to be considered generic; that is, "filter element" is to be considered to relate to a filtering device having a filtering surface or a filtering support surface for a filtering element having a filtering surface. Similarly "filtering surface" is to be considered as separate material added to a filter support surface or filter element, or as an intrinsic part of a filter support surface of filter element.

From the foregoing it is clear that this invention produces a concentrator, having a dynamic filtration device for separating solids and a filtrate, and which is designed to operate on a continuous basis. In one capability or operational attribute, a porous, dense and generally friable filter cake layer of predetermined thickness is built up on the filtering surfaces. Another operational attribute of the concentrator is to maintain the filter cake layer at a predetermined thickness during the operation of the concentrator. In one arrangement this is accomplished by using stationary filter elements with rotating discs facing each filter element and having a plurality of blades or vane protruding toward the filter surfaces. These vanes, while not touching the filtering surfaces, sweep the filter cake layer; prevent the accumulation of material from building, and produce a uniform filter cake layer of predetermined thickness determined by the spacing between the filtering surfaces and the blades. Another operational attribute of the concentrator is that the filter cake build up prevents solids from piercing the filter diaphragm or cloth. Additionally, because of the forces created within the separation chambers defined between the filtering elements and the rotor elements, the surface of the filter cake layer is scrubbed hydraulically by the solids-containing fluids within the concentrator thereby assisting in the prevention of any further accumulation of solid material on the filter element. As an additional attribute, in both the ingress and egress separation chambers or subchambers pluralities of planar turbulators are mounted to the rotor elements and configured to sweep through these particular chambers. Small predetermined clearances are provided between the turbulators and the walls of their separation chambers. Thus, as the turbulators sweep through the first and last subchambers any accumulation of solids on the walls of those subchambers is discouraged. This is important especially for the last or egress subchamber. In the first or ingress subchamber the more important effect of the turbulators 110 is their continuous stirring and homogenizing of the incoming solids-containing fluid.

In the foregoing description and for the various embodiments disclosed it is to be understood that elements described as stationary or moving can be modified to be mobile or stationary, provided only that the inventive concept embodied in this disclosure is carried out. Thus, the filter elements may be made to rotate while the "rotor elements" having vanes, ploughs and/or turbulators may be made stationary within the housing. Similarly, the entire housing may be rotated while either the "rotor elements"or the filter elements remain stationary. Similarly, elements which are particularly illustrated and/or described as solid or perforated may also be changed in design, provided the inventive concepts of this disclosure are incorporated in the overall construction of the device. Protection by Letters Patent of this invention in all its aspects as the same are set forth in the appended claims is sought to the broadest extent that the prior art allows.

We claim as our invention:

1. A dynamic concentrator for separating a filtrate and a concentrated slurry from a solids-containing fluid, said concentrator comprising ( ) a housing defining an enclosed separation chamber; (2) an inlet in said housing for the introduction of a pressurized solids-containing fluid into said chamber; (3) a first outlet in said housing; (4) at least one filter means comprising a filter chamber with at least one filtering surface thereon mounted in stationary relationship within said housing in the flow path of said solids-containing fluid between said inlet and said first outlet, said filtering surface disposed for passing a filtrate therethrough into the interior of the filter chamber from the solids-containing fluid; (5) a second outlet in said housing connected to the interior of said filter chamber for discharging the filtrate from said separation chamber and said filter means, said first outlet in said housing being constructed and arranged to discharge therethrough a concentrated slurry of solids produced by the removal of the filtrate from the solids-containing fluid, and (6) a rotor means rotatably mounted in said housing on a longitudinal axis thereof and disposed to have a motor means connected thereto for imposing rotation thereon, said rotor means having at least one radial element extending radially outwardly of said axis toward the interior surface of said housing but terminating in spaced relation thereto sufficient for fluid flow therebetween and having at least one blade projecting laterally from said radial element toward the filtering surface of said filter means parallel with said longitudinal axis of said rotor, said blade having an edge adjacent but spaced from said filtering surface and constructed and arranged to permit an initial build-up and the maintenance of a filter cake layer of predetermined thickness over said filtering surface by the rotation of said blade during the passage of solids-containing fluid through said housing from said inlet to said first outlet and the passage of filtrate through said filtering surface and into the chamber of its filter means and out of said second outlet.

2. A dynamic concentrator as set forth in claim 1 wherein the inlet in said housing is formed in a front end plate of said housing and the first outlet in said housing is formed in a rear end plate thereof, said concentrator having inlet and outlet separation chambers within said housing adjacent said inlet and outlet end plates respectively and further having at least one turbulator element comprising a perforated blade mounted to said rotor means within each said inlet and outlet separation chambers, said turbulators extending outwardly from said rotor means toward the interior surfaces of the inlet and outlet separation chambers respectively and each of said turbulators having an edge region adjacent but spaced at least slightly apart from the interior surface of the housing and being so constructed and arranged that a substantial accumulation of solids on the interior surfaces of the housing in the regions of said inlet and outlet separation chambers is prevented by rotation of the turbulator and rotor combination within those separation chambers.

3. A dynamic concentrator as set forth in claim 1 wherein the inlet in said housing is formed in a front end plate of said housing and the first outlet in said housing is formed in a rear end plate thereof, said concentrator having inlet and outlet separation chambers within said housing adjacent said inlet and outlet end plates respectively and said rotor means further comprising turbulator means mounted to said rotor within each said inlet and outlet separation chambers, said turbulator means being formed of a plurality of planar turbulator elements characterized by first and second edges and radiating outwardly from the longitudinal axis of said rotor means and extending out into said inlet and said outlet separation chambers, the first edges of said turbulator elements being adjacent but spaced apart from nearby filtering surfaces and the second edges of said turbulator elements being adjacent but spaced at least slightly apart from the interior surface of said housing whereby said turbulator elements are constructed and arranged to permit an initial build-up and the maintenance of filter cake layers of predetermined thickness over the filtering surfaces and to prevent substantial accumulation of solids in said inlet and outlet separation chambers by rotation of said turbulator means during the passage of solids-containing fluid through said housing from said inlet to said first outlet and the passage of filtrate from said filter means to said second outlet, and circular supporting members connecting the outer edges of each of said turbulators with the center points of said supporting members substantially coinciding with said longitudinal axis.

4. A dynamic concentrator as set forth in claim 3 wherein said rotor means has a rotor shaft mounted on the longitudinal axis within said housing passing coaxially through said concentrator and said turbulator means in said inlet and said outlet separation chambers comprises a plurality of generally planar elements radially mounted to said rotor shaft with the plane of each of said elements being substantially parallel to the axis of said shaft, and wherein said planar elements are shaped generally to conform to the longitudinal cross sectional area of the inlet and outlet separation chambers respectively in spaced relation at their edges to the interior surfaces of those chambers.

5. A dynamic concentrator as set forth in claim 1 wherein said rotor means includes at least one plough member mounted on the periphery of said radial element and extending outwardly therefrom toward the interior surface of said housing but terminating in spaced relation thereto, said plough member serving to deter accumulation of solids between said radial element and said housing as said rotor means is rotated.

6. A dynamic concentrator as set forth in claim 1 wherein said radial element is substantially imperforate with said blade projecting perpendicularly therefrom.

7. A dynamic concentrator as set forth in claim 1 wherein said blade edge is spaced apart from said filtering surface a distance of approximately one thirty-second (1/32) inch.

8. A dynamic concentrator as set forth in claim 1 wherein said blade edge is spaced apart from said filtering surface a distance in the range of approximately one sixteenth (1/16) to one thirty-second (1/32) inch.

9. A dynamic concentrator as set forth in claim 1 wherein said filter means is configured substantially circularly and the filtering surface thereof has an outer diameter of approximately 24 inches.

10. A dynamic concentrator as set forth in claim 1 wherein said filter means is configured substantially circularly and the filtering surface thereof has an outer diameter in the range of approximately 6 to 96 inches.

11. A dynamic concentrator as set forth in claim 1 having a plurality of said filter means mounted within said housing extending over transverse cross-sections thereof and coaxially spaced apart therein in the flow path of said solids-containing fluid, each of said filter means being characterized by a central opening and said rotor means having a shaft portion with clearance for flow of solids-containing fluid through the central openings in said filter means and having further a plurality of said radial elements mounted coaxially on said shaft portion between successive ones of said plurality of filter means.

12. A dynamic concentrator as set forth in claim 11 wherein each of said radial elements is characterized by a plurality of circumferentially spaced openings adjacent said shaft portion of said rotor means for passage of a portion of said solids-containing fluid through said radial elements.

13. A dynamic concentrator as set forth in claim 11 wherein each of said radial elements has at least one plough member mounted on its periphery and extending outwardly therefrom toward the interior surface of said housing but terminating in spaced relation thereto, said plough members serving to deter accumulation of solids between said radial elements and said housing as said rotor means is rotated.

14. A dynamic concentrator as set forth in claim 11 wherein each filter means of said plurality thereof comprises a filter chamber characterized by one side and another opposite side and having a filtering surface on each of said sides, and wherein further each radial element of said plurality thereof is characterized by one side and another opposite side and at least one radial element has at least one blade on each side thereof projecting laterally therefrom in edge-spaced relationship to a filtering surface of an adjacent filter means.

15. A dynamic concentrator as set forth in claim 11 in which each radial element of said plurality thereof is characterized by one side and another, opposite side and has a plurality of blades projecting laterally from at least one of those sides in edge-spaced relationship to a filtering surface of an adjacent filter means.

16. A dynamic concentrator as set forth in claim 15 further comprising a valve in said first outlet for controlling the discharge of concentrated slurry from that outlet.

17. A dynamic concentrator as set forth in claim 15 wherein the inlet in said housing is formed in a front end plate of said housing and the first outlet in said housing is formed in a rear end plate thereof, said concentrator having inlet and outlet separation chambers within said housing adjacent said inlet and outlet end plates respectively and further having at least one turbulator element comprising a perforated blade mounted to said rotor means within each said inlet and outlet separation chambers, said turbulators extending outwardly from said rotor means toward the interior surfaces of the inlet and outlet separation chambers respectively and each of said turbulators having an edge region adjacent but spaced at least slightly apart from the interior surface of the housing and being so constructed and arranged that substantial accumulation of solids on the interior surfaces of the housing in the regions of said inlet and outlet separation chambers is prevented by rotation of the turbulator and rotor combination within those separation chambers.

18. A process for separating a concentrated slurry and a filtrate from a solids-containing fluid, said process comprising the steps of (1) introducing a solids-containing fluid into one end of a housing characterized by said one end and another, opposite end and containing (i) at least one filter means comprising a filter chamber having at least one filtering surface, the interior of said chamber being in fluid communication with the exterior of said housing and said filtering surface being disposed in a path whereabout fluid may flow through said housing, and (ii) a rotor means including an edged blade disposed to be rotated with its edge turning substantially parallel with and in spaced relation to said filtering surface; (2) flowing said solids-containing fluid under pressure through said housing past and against said filtering surface and thereby and thereat effecting a separation of said fluid into a concentrated slurry flowing past said filtering means and a filtrate entering said filter chamber; (3) discharging the concentrated slurry from said other, opposite end of said housing and the filtrate from said filter chamber; (4) simultaneously with the effecting of said separation forming a filter cake layer on said filtering surface of solids deposited thereon from said solids-containing fluid, and (5) then and thereafter maintaining said filter cake layer at a predetermined thickness by rotation of the blade of said rotor means across that layer.

19. A process as set forth in claim 18 wherein said solids-containing fluid is selected from a group of fluids the solids of any of which form a hard, porous and substantially friable filter cake layer when deposited on said filtering surface.

20. A process as set forth in claim 18 including the step of moving said solids-containing fluid under pressure radially across said filtering surface and the solids deposited thereon by rotation of the blade of said rotor means.

21. A process as set forth in claim 18 including the step of producing a continuously moving wave of fluid across the surface of said filter cake layer by rotation of the blade of said rotor means thereby effecting hydraulic scrubbing of that surface.

22. A process as set forth in claim 18 including the step of pressurizing said solids-containing fluid sufficiently that that fluid is flowed through said housing at a pressure exceeding 200 pounds per square inch (psig).

23. A process as set forth in claim 18 including the step of pressurizing said solids-containing fluid sufficiently that that fluid is flowed through said housing at a pressure in the range of 100 to 375 pounds per square inch (psig).

24. A process for separating a concentrated slurry and a filtrate from a solids-containing fluid, said process comprising the steps of (1) introducing a solids-containing fluid into one end of a housing characterized by said one end and another, opposite end and having a longitudinal axis and containing (i) a plurality of annular filter means each comprising a filter chamber having at least one filtering surface located diametrally thereon, said filter means being arranged serially in spaced relation one to another along the longitudinal axis of said housing with their filter chambers being in fluid communication with the exterior of said housing, and (ii) a rotor means including (a) a shaft passing coaxially with fluid flow clearance through the central openings of said annular filter means, (b) a plurality of radially extensive discs fixed to that shaft and arranged thereon serially between successive ones of said filter means in spaced relation on each side thereto and terminating radially with fluid flow clearance between their outer peripheries and the interior surface of said housing whereby a sinuous fluid flow path is created between facing diametral surfaces of said annular filter members and said rotor discs with inner turns between the inner peripheries of said filter members and the outer surface of said shaft and outer turns between the outer peripheries of said rotor discs and the interior surface of said housing, and (c) at least one radially extensive edged blade on each of said rotor discs on the diametral surface thereof facing the filtering surface of an adjacent filter means with the edges of said blades being in spaced relation to said filtering surfaces; (2) flowing said solids-containing fluid under pressure through said housing by way of said sinuous path past and against said filtering surfaces and thereby and thereat effecting a separation of said fluid into an increasingly concentrated slurry flowing past successive filter means and a filtrate entering the filter chambers thereof; (3) discharging the fully concentrated slurry from said other, opposite end of said housing and the filtrate from said filter chambers; (4) simultaneously with the effecting of said separation forming filter cake layers on said filtering surfaces of solids deposited thereon from said solids-containing fluid, and (5) then and thereafter maintaining said filter cake layers at predetermined thicknesses by rotation of the blades of said rotor means across those layers.

* * * * *